(12) United States Patent
Becker

(10) Patent No.: US 7,865,333 B2
(45) Date of Patent: Jan. 4, 2011

(54) PROCESS AND DEVICE FOR MONITORING A MACHINE

(75) Inventor: Edwin Becker, Reken (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 122 days.

(21) Appl. No.: 12/361,057

(22) Filed: Jan. 28, 2009

(65) Prior Publication Data

US 2009/0217101 A1     Aug. 27, 2009

(30) Foreign Application Priority Data

Jan. 28, 2008   (DE)   ................ 10 2008 006 370

(51) Int. Cl.
*G06F 11/34* (2006.01)
(52) U.S. Cl. ................ 702/183; 702/179; 702/180; 700/108; 700/109; 700/110; 706/912; 714/33; 714/703
(58) Field of Classification Search ............ 702/81, 702/84, 182, 184, 183, 181, 179, 180; 700/174, 700/177, 108–110, 164, 125; 706/912; 714/33, 714/703
See application file for complete search history.

(56) References Cited

U.S. PATENT DOCUMENTS

| | | | | |
|---|---|---|---|---|
| 4,985,857 A | * | 1/1991 | Bajpai et al. ............. 702/184 |
| 5,210,704 A | | 5/1993 | Husseiny | |
| 5,457,375 A | * | 10/1995 | Marcinkiewicz et al. .... 318/802 |
| 5,648,919 A | | 7/1997 | Yamauchi et al. | |
| 6,643,592 B1 | * | 11/2003 | Loman et al. ............. 702/35 |
| 6,711,523 B2 | * | 3/2004 | Bechhoefer et al. ......... 702/181 |
| 6,859,756 B2 | * | 2/2005 | Allen ............ 702/183 |
| 6,968,293 B2 | | 11/2005 | Wiegand | |

(Continued)

FOREIGN PATENT DOCUMENTS

DE    101 39 968 A1    7/2002

(Continued)

OTHER PUBLICATIONS

Seung J. Rhee and Kosuke Ishii; Using Cost Based FMEA to Enhance Reliability and Serviceability; Advanced Engineering Informatics 17 (2003) 179-188; Department of Mechanical Engineering, Design Division, Stanford University, Stanford, CA 94305, USA; Available Online at www.sciencedirect.com.

*Primary Examiner*—Carol S Tsai
(74) *Attorney, Agent, or Firm*—Roberts Mlotkowski Safran & Cole, P.C.; David S. Safran

(57) ABSTRACT

A process for monitoring a machine, within the framework of a FMEA process for at least one component of the machine for at least one predetermined fault which can be diagnosed by means of a diagnosis diagram and a diagnosis system with sensors for detecting physical parameters of the machine, a diagnosis priority number being determined which is the product of the following index quantities: severity of the effect of occurrence of the fault with respect to the serviceability of the machine; expected machine-specific consequential costs when a fault occurs, and the possibility of correction of the fault. The diagnosis priority number is used in the evaluation of the diagnosis diagram, the diagnosis system, the current machine state, the necessary maintenance measures and/or the failure risk of the machine.

24 Claims, 4 Drawing Sheets

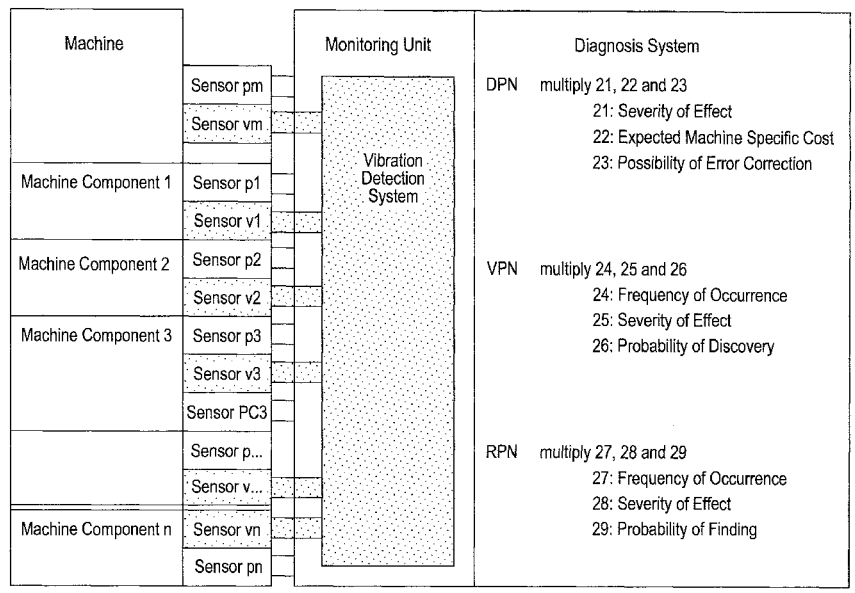

U.S. PATENT DOCUMENTS

| | | |
|---|---|---|
| 7,006,948 B2 * | 2/2006 | Allen .......................... 702/183 |
| 7,027,953 B2 * | 4/2006 | Klein .......................... 702/184 |
| 7,249,284 B2 | 7/2007 | Shah et al. |
| 7,337,092 B2 * | 2/2008 | Yuan et al. .................. 702/185 |
| 7,379,846 B1 * | 5/2008 | Williams et al. ............ 702/185 |
| 7,516,047 B2 * | 4/2009 | Allen .......................... 702/183 |
| 7,571,022 B2 * | 8/2009 | Jalluri et al. ................ 700/160 |
| 7,587,299 B2 * | 9/2009 | Miyasaka et al. ........... 702/183 |
| 2004/0143398 A1 * | 7/2004 | Nelson ......................... 702/14 |
| 2004/0263342 A1 * | 12/2004 | Matlock et al. ............. 340/648 |
| 2005/0154561 A1 * | 7/2005 | Legault et al. .............. 702/183 |
| 2007/0050178 A1 * | 3/2007 | Linzey et al. .................. 703/2 |
| 2007/0112746 A1 * | 5/2007 | Todhunter ....................... 707/4 |

FOREIGN PATENT DOCUMENTS

| | | |
|---|---|---|
| DE | 10 2005 031 436 A1 | 1/2007 |
| EP | 1 760 311 A2 | 3/2007 |

* cited by examiner

Fig. 1

| Machine | Monitoring Unit | Diagnosis System |
|---|---|---|
| Machine Component 1: Sensor pm, Sensor vm | Vibration Detection System | DPN  multiply 21, 22 and 23 <br> 21: Severity of Effect <br> 22: Expected Machine Specific Cost <br> 23: Possibility of Error Correction |
| Machine Component 2: Sensor p1, Sensor v1 | | VPN  multiply 24, 25 and 26 <br> 24: Frequency of Occurrence <br> 25: Severity of Effect <br> 26: Probability of Discovery |
| Machine Component 3: Sensor p2, Sensor v2, Sensor p3, Sensor v3, Sensor PC3 | | RPN  multiply 27, 28 and 29 <br> 27: Frequency of Occurrence <br> 28: Severity of Effect <br> 29: Probability of Finding |
| Machine Component n: Sensor p..., Sensor v..., Sensor vn, Sensor pn | | |

Fig. 2

Table 1

| No. | Mechanical assembly | Monitoring message | Deviation | Occurrence 24 | Importance 25 | Discovery (with CMS) 26 | Vibration frequency SPN |
|---|---|---|---|---|---|---|---|
| 1 | Generator | Increased vibration level Vibration rate (10 Hz-1 kHz) | greater than 6 mm/s | 2 | 5 | 1 | 10 |
| | | High vibration level Vibration rate (10 Hz-1 kHz) | greater than 10 mm/s | 2 | 8 | 1 | 16 |
| | | Increased vibration level Acceleration (10 Hz-5 kHz) | greater than 10 m/s2 | 6 | 4 | 2 | 48 |
| | | High vibration level Acceleration (10 Hz-5 kHz) | greater than 16 m/s2 | 3 | 7 | 2 | 42 |
| 2 | Transmission | Increased vibration level Vibration rate (10 Hz-2 kHz) | greater than 3.5 m/s | 6 | 5 | 1 | 30 |
| | | High vibration level Vibration rate (10 Hz-2 kHz) | greater than 5.6 m/s | 5 | 8 | 1 | 40 |
| | | Increased vibration level Acceleration (0.1 Hz-10 Hz) | greater than 0.3 m/s2 | 6 | 2 | 2 | 24 |
| | | High vibration level Acceleration (0.1 Hz-10 Hz) | greater than 0.5 m/s2 | 5 | 3 | 2 | 30 |
| | | Increased vibration level Acceleration (10 Hz-2 kHz) | greater than 7.5 m/s2 | 6 | 2 | 2 | 24 |
| | | High vibration level Acceleration (10 Hz-2 kHz) | greater than 12 m/s2 | 5 | 3 | 2 | 30 |

Fig. 3

Table 2

| No. | Mechanical assembly | Diagnosis Message | Diagnosis code | Degree of severity (21) | Consequential costs (22) | Correction possibility (23) | Diagnosis number (DPN) | Recommended correction measures |
|---|---|---|---|---|---|---|---|---|
| 1 | Drive and driven systems | | | | | | | |
| 1.1 | Driven line | Increased vibration level due to alignment deviation | OTS M 1 | 5 | 5 | 4 | 100 | Check alignment transmission-generator |
| | | High vibration level due to alignment fault | OTSM 2 | 6 | 5 | 4 | 120 | Evaluation and comparison with previous alignment protocols Visual check of coupling state (wear) Visual check for leaks (Gear driven side and/or generator A side) Correction of alignment Generator-transmission |
| | | Wobble frequency of driven line dominates | OTS M 3 | 8 | 6 | 10 | 480 | Evaluation and comparison with previous alignment protocols Visual check of vibration feet on generator Correction of radial and/or axial alignment in driven line and check of alignment protocol |
| | | 1st order increased vibration level (rotary frequency) | OTS U 1 | 4 | 2 | 3 | 24 | Determine/correct alignment inputs Visually check driven line components Balancing masses absent? |
| | | High rotary frequency vibrations | OTS U 2 | 5 | 5 | 6 | 150 | Operating balance, bearing inspection |
| | | Rotary frequency vibrations highly load dependent | OTS U 3 | 6 | 4 | 6 | 144 | Have generator checked by manufacturer |
| 1.2 | Drive line | Increased vibration level due to constraints from the drive line | PTS T 1 | 7 | 4 | 8 | 224 | Check main bearing system, clamp set, shrink seat Visually check elastomers on transmission (wear, loosening) Check angle of wind relative to blade |

Fig. 4

Table 3

| No. | Mechanical assembly | Deviation/fault | Possible cause | 27 Occurrence | 28 Importance | 29₁ Discovery (without CMS) | 29₂ Discovery (with CMS) | 29₃ Discovery (CMS and particle counter) | RPN1 Risk No. without CMS | RPN2 Risk No. with CMS | RPN3 Risk No. with CMS and particle counter |
|---|---|---|---|---|---|---|---|---|---|---|---|
| 1 | Drive and driven system | | | | | | | | | | |
| 1.1 | Drive line | Alignment deviation | Mounting | 8 | 6 | 8 | 5 | 5 | 384 | 240 | 240 |
| | | Alignment fault | Fault, wear | 5 | 7 | 3 | 3 | 3 | 105 | 105 | 105 |
| | | Wobbling, misalignment | Fault, wear | 4 | 7 | 3 | 3 | 3 | 84 | 84 | 84 |
| | | Unbalance | Mounting | 4 | 5 | 5 | 5 | 5 | 100 | 100 | 100 |

PROCESS AND DEVICE FOR MONITORING A MACHINE

BACKGROUND OF THE INVENTION

1. Field of Invention

This invention relates to a device and a process for monitoring a machine, especially a wind power plant.

2. Description of Related Art

With condition monitoring (CM), deviations in the running and operating behavior of machines and systems are to be detected in time and dedicated diagnosis messages on the machine state are delivered. The objective of a diagnosis can be a function diagnosis or a damage diagnosis. A function diagnosis relates to measurement of functional and operating parameters which are necessary for proper functioning and for economical operation of machines. Damage diagnosis is defined as determination of the damage state of machines and machine components. This includes all diagnosis measures for determining the degree of wear and its effects, fatigue and corrosion as well as other damaging effects. Complex diagnosis is the determination of the overall state of machines. The complex state is determined using several (complex) characteristics. Deep diagnosis relates to determination of the state of individual assemblies of machines or of the states of individual parts. Accordingly, it constitutes detail checking. Deep diagnoses are therefore used mainly for fault location and for establishing the scope of corrective maintenance before scheduled maintenance.

German Patent Application DE 10 2005 031 436 A1 relates to a process for monitoring fatigue of a wind power plant by means of vibration sensors, the stiffness matrix and inertia matrix being determined in order to detect state changes. European Patent Application EP 1 760 311 A2 describes a process for monitoring the state of a wind power plant by means of sensors attached to the main shaft, and among others, evaluation of fatigue is undertaken. Recommendations for measurement and assessment of mechanical vibrations of wind power plants are also described in VDE Guideline 3834.

Analysis of the type and effect of fault states (FMEA) (also called fault possibility effect analysis) is defined as a certain type of systematic procedure in the analysis of a system in order to determine types of possible fault states, their causes and their effects on system behavior. FMEA processes are used in many industrial domains, for example, also in plant construction, product development, product improvement and in part also in the development of maintenance schedules.

FMECA (analysis of type, effect and criticality of the fault state) designates a case of FMEA in which there is a means for classification of the severity of types of failure of the system in order to enable classification of the urgency of remedial measures. This takes place by combination of a measure for severity with the expected frequency of occurrence in order to produce a metric called "criticality".

A systematic description of FMEA can be found, for example, in DIN EN 60812.

For quantitative determination of the criticality of system faults or system failures, in FMEA typically a so-called risk priority number (RPZ) is used which follows from the product of the following index quantities: severity of the effect of the occurrence of the fault with respect to the functioning of the system; probability of discovery of the fault (estimated value for the chance of detecting and correcting the fault before the system is affected by the fault); frequency with which the fault occurs within a certain time interval. Typically each of the index quantities is assigned an integral value between 1 and 10.

U.S. Pat. No. 6,968,293 B2 suggests using the FMEA process in conjunction with state monitoring of systems, the application being the monitoring of railroad tracks; the use of risk priority numbers is also mentioned. U.S. Patent 2004/0263342 A1 relates to a process for state monitoring for an electric motor, parameters being monitored which are derived from FMEA fault types, for example, vibrations. U.S. Patent 2007/0050178 A1 relates to risk assessment for the cabling of aircraft, and vibrations can be incorporated into the assessment and the result can be delivered in the form of a FMEA report. DE 10 2004 015 400 A1 corresponds to U.S. Pat. No. 7,249,284 B2 describes a system for evaluating the maintainability of systems which has a FMEA interface. German Patent Application DE 101 39 968 A1 describes an automated FMEA process in which risk priority numbers are also determined.

SUMMARY OF THE INVENTION

A primary object of this invention is to devise a device and a process for monitoring a machine, with which in a reliable and practical manner machine states can be estimated in order to optimize machine benefit and to minimize operating risk.

This object is achieved as described herein below.

In the approach in accordance with the invention, it is advantageous that, by forming the vibration priority number (VPN) or the diagnosis priority number (DPN), a meaningful evaluation of the current machine state, the necessary maintenance measures, the diagnosis diagram and diagnosis system, especially of the vibration detection system, and/or the failure risk of the machine is enabled.

Preferably, in addition to the vibration priority number and/or the diagnosis priority number, a risk priority number (RPN) is determined which results from the product of the following index quantities: frequency with which a predetermined fault occurs in operation of the machine; severity of the effect of the occurrence of a fault with respect to the ability of the machine to function, and the probability of discovery of the occurrence of the fault by means of the diagnosis diagram and diagnosis system used, by which evaluation of the current machine state, the necessary maintenance measures, the diagnosis diagram, the diagnosis system and/or the risk of failure of the machine can be improved.

Advantageously, the machine is divided into several machine components, for each of the machine components, at least one vibration priority number, diagnosis priority number and/or risk priority number is determined.

Typically the machine is a wind power plant.

Other features of the invention will become apparent from the following detailed description and the accompanying drawing.

BRIEF DESCRIPTION OF THE DRAWINGS

FIG. 1 is a schematic diagram of a device for performance of the process of the invention, FIG. 2 is a table providing a practical example for determining vibration priority counts for the generator and transmission components of a wind power plant, FIG. 3 is a table providing a practical example for the establishment of diagnosis priority numbers for the drive line/driven line components of a wind power plant, FIG. 4 provides an example for establishing the risk priority numbers for the driven line component in a wind power plant.

DETAILED DESCRIPTION OF THE INVENTION

Within the framework of this invention, the FMEA processes are used to choose the state monitoring processes and diagnosis algorithms in a dedicated manner, to estimate diagnosis uncertainties and to derive suitable quantities for regular state monitoring. The invention also supports risk evaluation of machines and systems, for example, for insurers.

For executing the monitoring process, first of all, the following underlying knowledge should be available for the machine to be monitored:

knowledge and information on the structural design of the machine;

knowledge and information on the interaction of the individual assemblies of the machine which are to be monitored;

knowledge and findings on the characteristic diagnosis parameters, acceptance reference values and their tolerance ranges or segregation boundary values, which parameters are conventional for the machine;

information and findings about the faults and damage which are possible during use of the machine on the individual assemblies and their effects;

knowledge about the diagnosis processes to be used and the diagnosis conditions to be observed.

When using the invention for wind power plants, for example, coding can be used to identify similar and identical wind power plants, and to prepare an analogous procedure in the diagnosis process.

Conventionally, the machine is divided into several machine components (main component) for analysis. The processes described below are then carried out for each of these machine components.

The machine to be monitored is connected to a diagnosis system which has sensors for detecting physical parameters of the machine and the respective machine component and a monitoring unit which is made as a data processing system. Conventionally, the diagnosis system comprises at least one vibration detection system for detecting vibrations of the machine and of the machine component; in this case, the sensors can be, for example, acceleration sensors. Depending on the application, however, physical parameters other than vibrations can also be measured, for example, the concentration of particles of a certain size in the lubricant of the machine; conclusions about the current degree of wear of the machine can be drawn by this particle monitoring.

The machine depicted in the sole figure is connected to sensors are designated as 'Sensor p' for a physical quantity and 'Sensor v' for a vibration sensor. This designation is followed by another character designating the main part of the machine 'm' or by a number of a machine component ranging from 1 to n. As an example, Machine component 3 is equipped with a sensor designated as 'Sensor PC3' for a particle counter on machine component 3. This 'Sensor PC3' is used in order to determine the concentration of the particles in the lubricant of machine component 3.

Within the framework of the invention, the following priority numbers can be determined: vibration priority number (VPN), diagnosis priority number (DPN) and risk priority number (RPN).

In the determination of the vibration priority number, first of all, for each main component of the machine, at least one vibration boundary value, typically however several, are determined. The vibration boundary values can be, for example, generally known machine-specific boundary values. These machine-specific boundary values can be found, for example, in different standards (for example, ISO and AGMA) or guidelines (for example, API or VDI), these boundary values often being based on serial studies and systematic machine collections. One example is ISO 10816-3. For wind power plants, vibration boundary values can be found for example, in part 11 of the VDI Guidelines 3834.

Furthermore, if available, producer-specific and operator-specific boundary values can also be used. These boundary values are generally based on the experience of manufacturers and operators. In this connection, for example, a guideline of General Motors is mentioned, where acceptance bands for machine components for acceptances are used. However, for wind power plants, there are currently no such acceptance bands.

The vibration priority number VPN is the product of three index quantities 24, and 26 indicating the expected frequency with which the respective vibration boundary value of the machine component is exceeded, 24 indicating the expected severity of the effect of exceeding the vibration boundary value with respect to the functioning of the machine or the machine component, and 25 indicating the expected probability of discovery of the vibration boundary value being exceeded by means of the vibration detection system and diagnosis system provided. Thus, the quantity 24 stands for the occurrence and the probability of the vibration boundary value being exceeded, 25 standing for the importance or amount of damage from the vibration boundary value being exceeded and 26 standing for the probability of discovering that the vibration boundary value being exceeded. Typically, the vibration priority number is defined such that each of the three quantities 24, 25 and 26 can assume an integral value between 1 and 10, so that the vibration priority number can be between 1 and 1000. The assignment of the corresponding value of 24, 25 and 26 for the respective vibration boundary value and the respective machine component takes place as far as possible on the basis of operating experience with the machine to be monitored or of the type of machine to be monitored or must otherwise be derived from general principles. One example of how this assignment can take place is indicated below.

Index quantity 24 (occurrence/probability): It is evaluated with which frequency the vibration boundary values of a machine are exceeded. Here:

1 improbable
2-3 isolated
4-6 often
7-8 regular
9-10 permanent

Index quantity 25 (importance/amount of damage): With this evaluation the effects and consequences for the system are shown: Here:

1 no importance
2-3 little importance
4-6 adversely affects service life
7-8 reduces service life
9-10 damages system Index quantity 26 (probability of discovery): This evaluation yields a statement on the detectability of additional vibrations with different CM techniques. Here:

1-2 high with online CM, characteristics directly measured
3-5 good with online CM, characteristics indirectly measured
6-8 low, with offline CM, characteristics directly measured
9-10 very low with offline CM, characteristics indirectly derived A practical example for determining vibration priority counts for a wind power plant is given in FIG. 2, for the components generator and transmission.

The vibration priority number VPN can be used in the evaluation of the current machine state, necessary maintenance measures, the vibration detection system and/or the failure risk of the machine and other machine components. The vibration priority number VPN can also be used in the choice of the vibration detection system. Preferably, the time development of the vibration priority number is tracked and evaluated for purposes of evaluating the change of the machine state over time. In particular, the vibration priority number can also be considered in the decision about the time and type of pertinent maintenance measures.

The diagnosis priority number DPN is the product of three index quantities 21, 22 and 23. The diagnosis priority number is determined for each machine component for at least one predetermined fault, typically several, which can be diagnosed by means of the diagnosis diagram used and the diagnosis system used. Here 21 indicates the expected severity of the effect of occurrence of the fault with respect to the ability of the machine to function and of the machine component; 22 indicates the expected machine-specific consequential costs when a fault occurs; and 23 indicates the possibilities of correction of the fault before it can damage the machine (23 thus relates to the possibility of "prompt" correction of the fault).

The severity of effect quantity 21 results from the effect of the diagnosis on the higher-order system, correction results and expected remaining service lives of the machine from comparable cases. By using the probability of correction quantity 23 it will be taken into account that prompt corrections lead to lower hazard rates; thus, for example, already completed inspections, such as video endoscopy, can be used for reducing risks and degrees of severity of faults.

The diagnosis priority number DPN can be used in the evaluation of the diagnosis diagram, the diagnosis system, the current machine state, the necessary maintenance measures and/or the failure risk of the machine. In particular, the diagnosis priority number DPN can be used in the choice of the diagnosis diagram and/or of the diagnosis system and in the decision about the time and type of maintenance measures to be taken. Preferably, the diagnosis priority number is recorded at regular time intervals and filed in a machine-specific manner. Operating and service experience can be considered by way of the severity of effect and expected machine-specific cost quantities 21, 22. The diagnosis priority number can be incorporated specifically into maintenance processes and diagnosis processes by way of possibility of correction quantity 23. By means of the diagnosis priority number diagnosis findings, maintenance measures and alternative detectabilities can be continuously balanced and filed for example, monthly in a machine-specific manner.

One example for assignment of the quantities 21, 22 and 23 is given below.

Index quantity 21 (severity of the effect of the diagnosed fault and expected remaining service life) follows from the effect of the diagnosis on the higher-order system, correction results and expected remaining service life from comparable cases. Here:

9-10 extremely serious effects, remaining service life only a few hours 8 very serious effects, remaining service life only a few days 7 effects to be taken seriously, but can be operated for a few weeks 4 still serious effects, can be used for several months 3 mild effects, can be used for up to one year 1 without importance Index quantity 22 (probable consequential costs when damage occurs): If damage occurs or there is practical experience with comparable damage, machine-specific consequential costs can be quantified. Here:

10 total system damage and existence-threatening consequential costs 8-9 very high consequential costs 5-7 high consequential costs 3-4 moderate consequential costs 1-2 low consequential costs Index quantity 23 (possibility of correction of the diagnosed fault): Prompt corrections lead to a low hazard rate and reduce the diagnosis number. Thus, completed inspection such as video endoscopy can also be used to reduce risks and degrees of severity. Here:

9-10 no chance of correction, or correction not done 7-8 poor correction possibilities 5-6 moderate correction possibilities 4-5 good correction versions 2-3 corrections completed 1 correct completed, danger eliminated The resulting value of the diagnosis priority number DPN can be evaluated for example, as follows:

1<DPN<100: acceptable remaining risk of diagnosis, no additional measures necessary 100<DPN<125: low residual risk, at least additional warning and correction measure necessary 125<DPN<250: increased residual risk, at least additional maintenance measure necessary 250<DPN<1000: unacceptable residual risk, structural modification measure absolutely necessary or danger of failure One practical example for the establishment of diagnosis priority numbers for a wind power plant is shown in FIG. 3 for the components drive line/driven line.

Furthermore, within the framework of the invention risk priority numbers are used which are the product of the three index quantities 27, 28 and 29, for each machine component for at least one predetermined fault (typically for several different faults) one risk priority number at a time being determined. Here 27 indicates the expected frequency with which the respective fault occurs in operation of the machine; 28 indicates the expected severity of the effect of the occurrence of the fault with respect to the functioning of the machine and the machine component, i.e. the importance and the amount of damage from the fault; and 29 designates the expected probability of discovery of the occurrence of the fault by means of the diagnosis diagram and diagnosis system used, here its also being included at which instant or in which state the fault can be detected. Thus $A_R$ relates to the occurrence or the probability of a certain fault, $B_R$ relates to the importance or amount of damage from the fault and $E_R$ relates to the (prompt) detectability of the fault.

Typically here, as in the other priority numbers within the framework of FMEA, the respective quantity 27, 28 and 29 is also evaluated based on the available information with respect to the machine and where necessary based on general considerations with an integer between 1 and 10, one example being given below.

Index quantity 27 (occurrence/probability, i.e., frequency of fault occurrence): It is evaluated with which frequency a fault in the machine can occur and how great the risk is that the fault is occurring in the evaluated machine. Here:

1 very good/very rare 2-3 occurs quite rarely 4-6 occurs rarely
7-8 occurs often
9-10 can occur very often Index quantity 28 (severity of effect, i.e., importance/amount of damage): With this evaluation the effects and consequences for the system are shown: Here:
1 very minor fault/no effect on the system
2-3 minor fault/little effect on the system
4-6 moderately severe fault/moderate effect on the system
7-8 serious fault/major effect on the system
9-10 very serious fault/very major effect on the system Index quantity 29 (detectability, i.e., probability of finding fault): This evaluation yields a statement on the detectability of the fault and at what instant the fault is detected. Condition monitoring methods make it possible to reduce risk priority numbers and compare them to one another by way of detectability. Here:
1 very easily detectable
2-3 easily detectable
4-6 detectable
7-8 poorly detectable
9-10 hardly detectable Generally, in FMEA, risk priority numbers larger than 125 are considered critical and require special measures. For example, an improved diagnosis system can raise the detectability $E_R$ in order to reduce the risk priority number; in a wind power plant, for example, in addition to the vibration sensors, there is a counter for the number of particles of a certain size class in the lubricant in order to improve the detectability of faults on the drive line.

The risk priority number can be used in the evaluation of the current machine state, the necessary maintenance measures, the diagnosis diagram, the diagnosis system and/or the failure risk of the machine or the machine component. Furthermore, the risk priority number can be used in the design of mechanical and/or configuration improvements of the machine. The risk priority number can also be used in the choice of the diagnosis system or of the diagnosis diagram. Furthermore, the risk priority number can be considered in the decision about the time and the time and type of maintenance measures to be taken.

Diagnosis processes can be chosen depending on the risk priority number, and parameterizations can be defined both in the band and also in the warning and alert value. In particular, risk reductions can also be quantitatively estimated by using different diagnosis systems (for example, adding a particle counter).

One example for establishing the risk priority numbers in a wind power plant is shown in FIG. 4 for the component driven line.

In the example from FIG. 4, three different values for the detectability 28 are given, depending on what type of diagnosis system is used, specifically (1) without the condition monitoring system (CMS), (2) with the standard CMS and (3) with standard CMS plus particle counter, from which three different values for the risk priority number can result. In this way, by way of the effect of the choice of the diagnosis system (here: type of CMS) on the risk priority number for example, it can be estimated to what extent higher investment for a more complex diagnosis system leads to reduced system risk.

What is claimed is:

1. Process for monitoring a machine, within the framework of a fault possibility effect analysis (FMEA) process for at least one component of the machine for at least one predetermined fault which can be diagnosed by means of a diagnosis diagram and a diagnosis system with sensors for detecting physical parameters of the machine, comprising the steps of:

determining a diagnosis priority number which is a product of the following index quantities: severity of the effect of occurrence of the fault with respect to the functioning of the machine; expected machine-specific consequential costs when a fault occurs; and the possibility of correction of the fault; and using the diagnosis priority number determined for evaluation of at least one of a diagnosis diagram, diagnosis system, current machine state, necessary maintenance measures and failure risk of the machine.

2. Process in accordance with claim 1, wherein the machine evaluated on the basis of an evaluation of several machine components of which it is comprised and wherein at least one diagnosis priority number is determined for each of the machine components evaluated.

3. Process in accordance with claim 1, wherein the diagnosis priority number is used in selection of at least one of a diagnosis diagram and a diagnosis system.

4. Process in accordance with claim 1, wherein the diagnosis priority characteristic number is used for determining the timing and type of maintenance measures to be performed.

5. Process in accordance with claim 1, wherein the diagnosis priority number is recorded at regular time intervals.

6. Process in accordance with claim 1, wherein the expected remaining service life of the machine is considered in determining the severity of the effect of the occurrence of the fault.

7. Process for monitoring a machine within the framework of a fault possibility effect analysis (FMEA) process for at least one component of the machine for at least one predetermined vibration boundary value of the at least one machine component, comprising the steps of:

determining a vibration priority number which is a product of the following index quantities: frequency with which a predetermined vibration boundary value is exceeded; severity of the effect of the vibration boundary value being exceeded with respect to the functionality of the machine; and probability of discovery of the vibration boundary value being exceeded by means of the vibration detection system which is provided, and using the vibration priority number for evaluation of at least one of a current state of the machine, necessary maintenance measures, vibration detection system and the risk of machine failure.

8. Process in accordance with claim 7, wherein the machine evaluated on the basis of a separate evaluation of each of several machine components of which it is comprised with at least one vibration priority number being determined for each of the machine components.

9. Process in accordance with claim 7, wherein the vibration priority number is used in the choice of the vibration detection system.

10. Process in accordance with claim 7, wherein the vibration priority number is tracked over time and is evaluated for purposes of evaluating the change of the machine state over time.

11. Process in accordance with claim 10, wherein the tracked vibration priority number is considered in deciding the time and type of pertinent maintenance measures.

12. Process in accordance with claim 7, wherein a risk priority number is determined for at least one predetermined fault for at least one component of the machine, the a risk priority number being determined as a product of the following index quantities: frequency with which a predetermined fault occurs in the operation of the machine; severity of the effect of the occurrence of a fault with respect to the functioning of the machine; and probability of discovery of the occurrence of a fault by means of a diagnosis diagram and diagnosis system being used; and wherein the risk priority number is used in the evaluation of a current machine state, necessary maintenance measures, the diagnosis diagram, the diagnosis system and the failure risk of the machine.

13. Process in accordance with claim 12, wherein the machine evaluated on the basis of separate evaluation of each of several machine components of which it is comprised with at least one risk priority number being determined for each of the machine components.

14. Process in accordance with claim 12, wherein the risk priority number is used in at least one of designing of mechanical and configurational improvements for the machine.

15. Process in accordance with claim 12, wherein the risk priority number is used in making a choice of at least one of the diagnosis system and of the diagnosis diagram used.

16. Process in accordance with claim 12, wherein the risk priority number is considered in deciding the time and type of maintenance measures to be taken.

17. Process in accordance with claim 12, wherein the diagnosis system has vibration sensors.

18. Process in accordance with claim 12, wherein the diagnosis diagram has vibration boundary values.

19. Process in accordance with claim 7, wherein each of the index quantities has an integer value between 1 and 10.

20. Process in accordance with claim 7, wherein the machine is a wind power plant.

21. Process in accordance with claim 13, wherein the machine components include at least a drive line of a wind power plant.

22. Device for monitoring a machine, comprising:
a diagnosis system with sensors for detecting physical parameters of the machine and
a monitoring unit having a data processing system and which, within the framework of a fault possibility effect analysis (FMEA) process for at least one machine component for at least one predetermined fault which can be diagnosed by means of a diagnosis diagram and a diagnosis system, determines a diagnosis priority number which is a product of the following index quantities: severity of the effect of the occurrence of the fault with respect to the functioning of the machine; expected machine-specific consequential costs when a fault occurs; and the possibility of correction of the fault.

23. Device in accordance with claim 22, wherein the diagnosis system with sensors for detecting physical parameters of the machine and the monitoring unit, for at least one machine component for at least one predetermined fault, a risk priority number which is the product of the following index quantities: frequency with which the predetermined fault is exceeded in the operation of the machine; severity of the effect of the occurrence of the fault with respect to the functioning of the machine; and the possibility of detection of the occurrence of the fault by means of the diagnosis diagram and diagnosis system used.

24. Device for monitoring a machine, comprising:
a vibration detection system for detecting vibrations of at least one machine component, and
a monitoring unit having a data processing system and which, within the framework of a fault possibility effect analysis (FMEA) process for at least one machine component for at least one predetermined fault vibration boundary value of the machine component, determines and outputs a vibration priority number which is a product of the following index quantities: frequency with which the predetermined vibration boundary value is exceeded; severity of the effect of the vibration boundary value being exceeded with respect to the functioning of the machine; and the possibility of detection of the vibration boundary value being exceeded by means of the vibration detection system which is provided.

* * * * *